June 17, 1958 W. L. VERCH ET AL 2,839,052
APPLIANCE FOR TREATING INFECTIONS
Filed Jan. 22, 1953 2 Sheets-Sheet 1
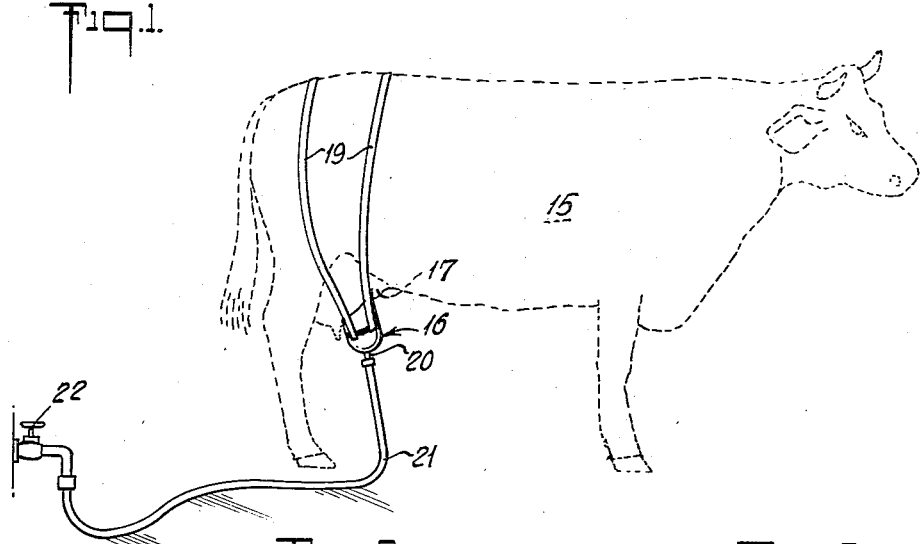
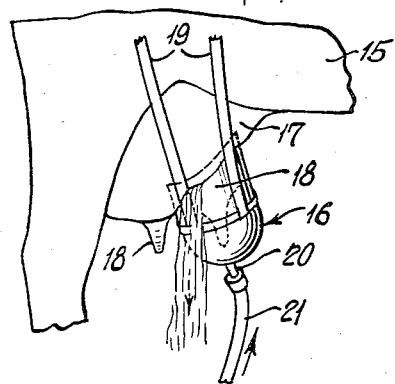
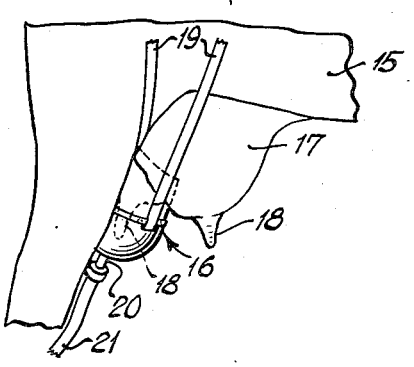
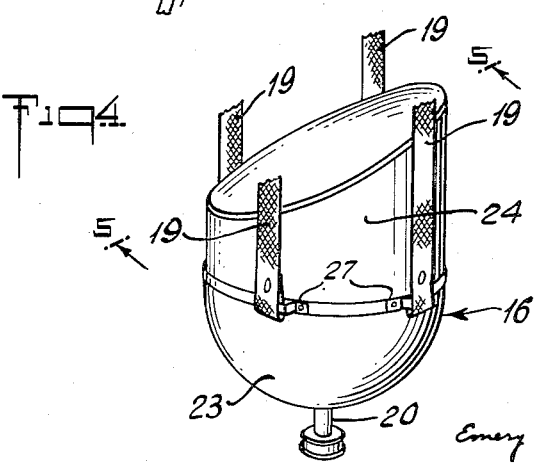
INVENTORS:
WILLIAM L. VERCH
MEYER I. BLOCK
BY
Emery Varney Whittemore & Cox
ATTORNEYS:

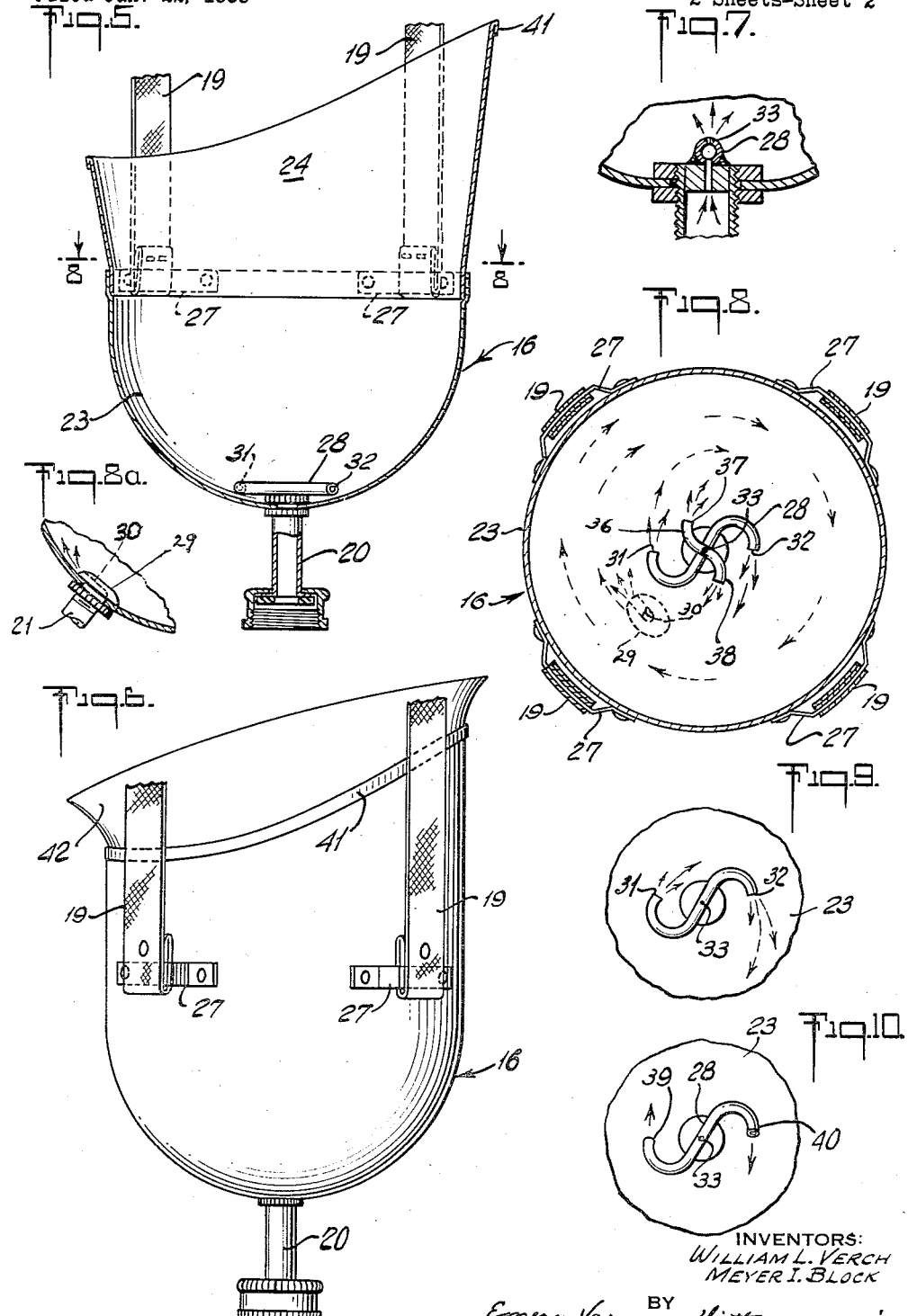

United States Patent Office 2,839,052
Patented June 17, 1958

2,839,052

APPLIANCE FOR TREATING INFECTIONS

William L. Verch, Yonkers, N. Y., and Meyer I. Block, Miami, Fla.

Application January 22, 1953, Serial No. 332,628

3 Claims. (Cl. 128—66)

This invention relates to a novel method of treating infections in certain parts of animals, and the invention further relates to an improved structure of an appliance for receiving certain portions or parts of an animal's body for successfully treating infections.

For reference and for the description herein, the following disclosure as to method and apparatus will be directed, as an example, to the treatment of mastitis infections in female animals, and will be particularly directed to the most usual infection of the mammary glands of cows. This infection is known as mastitis.

This invention also relates to an improved structure for external application and massaging of an infected part of the cow's body, whereby the treatment usually brings new blood to the infected part, thus to more rapidly dissipate infections and to assist in recuperation of the animal. The method of operation and the appliance have been found to be helpful in use at intervals to maintain good health of the animals.

One of the main features of this novel invention is the provision of a method of successful treatment for reducing, and curing in many instances, the infection known as mastitis in cows and in other animals.

Another of the main features of this novel invention is to provide an appliance that is so constructed as to fit many portions or parts of the animal, to provide a turbulent flow of fluid around that portion of the body that is selected to have the turbulence act externally, and usually in a massaging manner, to create an increased flow of blood through the infected part.

Another feature of the invention is to provide an improved appliance, device or receptacle, that is constructed to receive an infected part of an animal's body, and to flow a liquid in a highly turbulent fashion around that part particularly infected, and to cause the liquid to rise against other areas of the part treated, and at that position to become less turbulent. This whole treatment and the means for accomplishing it assists in creating a better flow of blood through the highly infected part, thereby helping in dissipating the infection.

Another feature of this invention is to provide a novel structure of an appliance that fits a portion of an udder of a cow and that permits the liquids to be flowed around the teat and lower part of the udder quarter selected, in very high turbulence, and to have the liquid rise in the appliance and into engagement with the upper part of the udder quarter.

A further feature of the invention is to provide a novel construction of the appliance so as to direct the treating liquid in its flow into the appliance in somewhat definite paths and to have cooperation with the walls of the appliance to create efficient turbulence of the liquid around the infected part of the cow.

Another feature of the invention is to provide a receptacle which fits one quarter of the udder of a cow and to have a fluid supply enter the receptacle at or near the base thereof, and to have a guiding nozzle which causes the fluid to flow in turbulated and/or circular fashion around the teat and the lower part of the udder, to create a definite massaging of the teat and udder to cause the mastitis infection of those parts to be dissipated.

Further objects and features of the invention will be particularly noted in the detailed description below, wherein—

Fig. 1 is a general view of the appliance as applied to a front quarter of an udder of a cow;

Fig. 2 is an enlarged view of Fig. 1 showing the passing of the fluid through and over the improved device;

Fig. 3 shows the device or appliance as positioned on one of the rear quarters of the udder;

Fig. 4 is a perspective view of the appliance itself and as being constructed of two parts, and with the retaining straps;

Fig. 5 is a sectional view taken on the line 5—5 of Fig. 4 with the top portion being somewhat flared out;

Fig. 6 is a perspective view of the appliance as made in one piece, and with an adaptor to be employed at various times;

Fig. 7 is a sectional view of the liquid inlet at the base of the appliance and shows the cross section of the directing nozzle;

Fig. 8 is a sectional view on the line 8—8 of Fig. 5 showing one form and position of the directing nozzle in the base of the appliance;

Fig. 8a illustrates another type of fluid treating nozzle that guides the fluid into turbulent fashion;

Fig. 9 is a modified form of the directing nozzle wherein the fluid is directed around the base of the appliance in two different paths due to the different radii in the bending of the directing nozzle; and Fig. 10 is a modified form of the directing nozzle wherein the two exit ends of the nozzle are at different heights in respect to the base of the appliance, and, therefore, direct the treating fluid in different paths to create a highly turbulent condition of the fluid.

Before setting forth the detailed description of the method and appliance for treating a general infection, the following information will be presented as directed to an infection in cows known as mastitis which is the infection of the mammary gland that produces milk. It has been found that mastitis in cows may be of the following types: acute mastitis, subacute mastitis, chronic mastitis, and swelling of the udder following calving. The mastitis infection usually is noted by pussy, flaky and watery milk, and by a hardening of the udder.

The detection of infection at an early period is particularly desirable because the butter fat content of the milk is lost in the affected quarter of the udder when there is mastitis. Therefore, if one quarter of the udder is affected, there is a loss of one-quarter of marketable milk.

The theory, as now understood of treating this mastitis infection, is, first, to check the flow of milk to note any presence of an infection. This is accomplished by the taking of a sample of the first flow of milk from an udder quarter and noting its constituency, and thereafter adding an equal quantity sample of good milk and noting whether there is a separation of the first sample from the second. If the mastitis infection is noted, then the appliance is fitted to the infected quarter and is usually positioned so that the end of the teat is positioned in the appliance at a distance of from 1" to 3" above the nozzle which guides the treating fluid. The treating fluid is then introduced into the appliance and the exit end, or ends, of the nozzle or nozzles direct the fluid against the teat to some extent and against the side of the appliance in a manner that causes the treating fluid to become turbulent and to engage the teat in a fashion that causes a massaging of the teat by reason of the turbulence of the fluid, and then to rise in the appliance and come against the udder quarter that is positioned within the appliance and at this position becomes less turbulent as it is in contact with the udder, but the treating fluid is still under motion around the udder quarter, and then it overflows from the appliance.

Usually it is desirable to have considerable turbulence around the teat and especially at the portion thereof which joins the udder quarter. It is desirable in the method of treating this infection to have the treating liquid proceed in a somewhat whirlpool type of turbulence, although different types of nozzles may be employed to create a desirable type of turbulence in the treating fluid so that the teat is well massaged.

Usually this type of treatment proceeds from 10 to 20 minutes twice a day, and it has been found to remove practically all of the infection after 6 to 15 treatments. These treatments are for the normal infection, but if there is chronic mastitis and swelling of the udder following calving, then the treatments should be continued for a longer period.

The method of treatment is divided into two types of application; (a) where there is incipient calving or after calving, and (b) where there is just the infection condition of the animal. In the first condition none of the quarters of the udder are stripped (milked) before or after the treatment. In the second condition of the animal, it is very desirable to strip each infected quarter before and after the treatment.

In considering the details of the appliance herein and its application and method of operation, reference is particularly made to the drawings.

A cow 15 is shown in Fig. 1 with the appliance 16 positioned on one of the front quarters of her udder, and Figs. 2 and 3 illustrate an udder teat 18 positioned somewhat near the bottom of the appliance 16. This appliance is held in position by any suitable means, such as straps 19. The appliance or device 16 is provided with an attachment 20 for receiving treating liquid through a flexible hose 21 which has one end attached to the appliance 16 and the other end to a suitable liquid supply as by a valve 22.

Fig. 3 shows the appliance 16 as positioned on a rear quarter of the cow's udder.

A preferred type of appliance 16 is illustrated in Fig. 4 wherein the base portion 23 is shown in the preferred form of being substantially a cup-shape or half of a sphere, and a top portion 24 preferably shown affixed to the lower portion 23 in a substantial non-leaking construction. However, while this top portion 24 is shown straight upward and of equal diameters, it may be flared as in Fig. 5 which allows a more easy assembly of the quarter of the udder in the appliance.

Referring now to Fig. 5, an improved type of appliance is shown in cross-section taken mostly on the line 5—5 of Fig. 4, but showing a somewhat flaring top. The lower portion 23 is shown to be fastened to the upper portion 24 in any suitable manner as by welding or by pressing together in a manner to prevent any substantial leak of the treating fluid. The supporting straps 19 are fastened to said appliance in any satisfactory manner as through clamps 27 (Fig. 8) so that the appliance 16 may be properly held in position on the treated part of the animal.

Further in reference to Fig. 5, the attachment 20 is shown partly in cross-section and as having a nozzle 28 mounted in the interior of the appliance or device 16, and preferably in a suitable non-leaking arrangement, as shown by the assembly in Figs. 5 and 7. However, these parts are such that they may be easily removed for proper cleaning.

Figs. 7 and 8 illustrate a preferred type of nozzle construction and as being located at the base of the appliance 16. However, a modified form of nozzle 29 is shown in Fig. 8a and as being positioned somewhat near the bottom of the appliance and being close against the lower portion 23 of the appliance and having an outlet 30 (Figs. 8 and 8a) which directs the flow of liquid against the walls of the lower part of the appliance in a manner to cause a turbulence in the flow of the treating liquid.

In regard to the nozzle 28, Figs. 7 and 8 illustrate exit ends 31 and 32 and a smaller exit 33 (Fig. 7) all of which cooperate to cause a turbulence of the treating fluid so that the infected quarter and teat of the animal are subjected to a treating fluid moving in the turbulent fashion, and usually in a fairly highly turbulent fashion. Such turbulent type of flow gives a massaging result to the teat and to the lower part of the udder quarter. It is usually in this area that the infection develops and exists. The opening 33 allows quite a direct stream against the teat, at least in the beginning of the treatment. A duplicating nozzle 36 having exits 37 and 38 is noted in Fig. 8, and the nozzles thereof are shaped so as to cause the treating fluid to exit into the lower portion 23 of the appliance 16 in a manner that further creates considerable turbulence of the treating fluid. It will be noted that the treating fluid will exit into the lower part of the appliance in directed fashion by the nozzles, and will engage the walls of the appliance and be further deflected in different directions so as to cause a relatively high turbulence of the fluid in such a manner that it assists materially in massaging the infected part of the animal which is held within the appliance.

In the drawings the nozzles are shown as being positioned in the lowest point of the appliance or device, but the position of the nozzles is not limited to that particular position as may be noted in the positioning of the modified nozzle 29 in Figs. 8 and 8a. The main purpose is to have the nozzles positioned so that the treating fluid as it exits from the nozzles will cause a turbulence and the shape of the lower portion 23 of the appliance will assist in creating this desired turbulence. If desired, a suitable baffling structure may be employed to assist in creating further turbulence of the treating liquid.

While the nozzles 28, 29 and 36 shown in Figs. 8 and 8a are constructed in different forms, and 28 and 36 to usually have the same curvature, it may be desirable in several instances to change the position of the nozzle exits 31 and 32 as by changing the radii of the bendings. Such change in bending is shown in Fig. 9 where the left hand exit 31 has a predetermined position due to the curvature of the nozzle being of smaller radius than the curvature of the right hand side for exit 32, thus causing different paths of flow of the treating liquid in and around the lower portion 23 of the appliance.

Again, in Fig. 10, there is a modified form of nozzle wherein the exit end 39 of nozzle 28 is turned downwardly and the exit end 40 is turned upwardly so that these two exit ends 39 and 40 are not in the same level or plane, and thus create a considerable change of turbulence within the appliance. The preferred forms of nozzles and their slight modifications thereof, are shown in Figs. 5, 7, 8, 8a, 9 and 10.

It will be understood that other modified types of nozzles may be employed, where the device is applied to different parts of the animal's body than to the udder, and the nozzles may be particularly formed so that a definite considered type of turbulence of the treating fluid will result.

It will be understood that the treating liquid employed may be a liquid provided with an antiseptic of particular composition. However, it has been found in the treatment of mastitis for cows that cold water varying near 50° to 65° F. is very helpful. Usually water much colder than that is not too greatly desired, although it is effective. Water of temperature above 65° is not so effective, but may be cooled, or each treatment may be continued for a longer period of time.

Referring to Fig. 6, it will be noted that the appliance or device 16 may be made as a seamless drawing of noncorrosive material and may have its upper edge 41 easily turned over as is also shown in Fig. 5. In Fig. 6 there is also shown an adapter 42 which makes it easier for receiving larger sizes of udders of cows.

The preferred appliance herein illustrated is normally to be made of aluminum of suitable thickness. However, stainless steel may be employed. Also, rubber of the pliable construction, or of a construction recognized as hard rubber, may be employed. In addition, the appliance may be made of suitable plastic material.

It will be understood that changes in the structure of the appliance may be incorporated in devices to be applied to different portions of the body of male or female animals, but the principal of operation of treating an infected part by subjecting it, for a desired length of time, to a treating liquid, preferably moving in turbulent fashion, may be considered as being within the scope of this invention.

It will be further noted that the steps in the method are all desirable in accomplishing the dissipation and cure of the infection. Also, the treatment may be effected in different ways, but if such treatments particularly massage the infected part or parts by subjecting it or them to the treating liquid in a high turbulent condition and have the liquid at a desirable temperature, then such treatments are within the disclosures made herein.

It will be understood that various modifications and changes may be made in the preferred form of the appliance herein, and such modifications and changes are to be understood as part of this device, as outlined in the following claims.

The invention claimed is:

1. In a device of the character described for treating mastitis in animals, the combination of a receptacle appliance for receiving water at approximately 55° F. and having it pass upwardly therethrough in a circuitous path, said receptacle appliance adapted to receive the infected part of an animal, a water inlet near the base of said receptacle, water supply therefor, a single nozzle element fastened near the base of said receptacle and being connected to said water supply, said nozzle element having two exit openings at different positions to guide the water around the base of said receptacle, one of said exits being at a different height from the base of said receptacle than the other exit thus to cause said water to swirl in turbulent fashion within said container and around the infected part of the animal.

2. In a device of the character described for treating mastitis in animals, the combination of a receptacle of enlarged cup-shape and of material height adapted to receive a quarter of a cow's udder and a teat thereof within said receptacle and allowing the end of the teat to be approximately 1" from the base of said receptacle, a treating liquid supply connected to the base of said receptable, a single S-shaped nozzle held on the interior of said receptacle near the base thereof and connected to said treating liquid supply, said nozzle guiding said liquid supply in two different paths causing a turbulent flow of said liquid against said teat in a massaging fashion to cause an increased flow of blood to said teat, and then pass upwardly to engage said udder portion in a less turbulent manner to increase the flow of fluid therethrough and then to flow over the top of said receptacle.

3. In a device of the character described for treating mastitis in cows, the combination of a receptacle comprising a lower portion of semi-spherical shape and an upper portion affixed in substantial non-fluid leaking engagement with said lower portion and having its top edge cut off on the bias and turned over to form a smooth edge, a series of holders attached to said receptacle, straps fastened to said holders and adapted to pass around the cow to hold said receptacle in predetermined position, said receptacle adapted to receive a quarter of a cow's udder and the teat thereof and having the free end of said teat positioned near the base of said lower portion, an attachment fastened to the base of said receptacle for introducing a treating liquid, a supply for said treating liquid, a nozzle structure held within said receptacle at the base thereof and having at least two exits one of which permits the treating fluid to be directed toward and against said teat and the other of which exits guides said treating liquid against the lower portion of said receptacle, both of said nozzle directing exits and the lower portion of said receptacle guiding the treating liquid to engage said teat and the lower portion of said udder in turbulent fashion to thereby cause an increase of flow of blood in the udder quarter and its extended teat.

References Cited in the file of this patent

UNITED STATES PATENTS

| 2,304,616 | Watson | Dec. 8, 1942 |
| 2,350,183 | Newell | May 30, 1944 |
| 2,435,894 | Marc-Aurele | Feb. 10, 1948 |

FOREIGN PATENTS

| 130,417 | Germany | Apr. 29, 1902 |
| 1,014,580 | France | June 18, 1952 |